Oct. 15, 1963 A. A. HUTCHINS 3,106,806
WORK SMOOTHING TOOL
Filed April 2, 1962 2 Sheets-Sheet 1
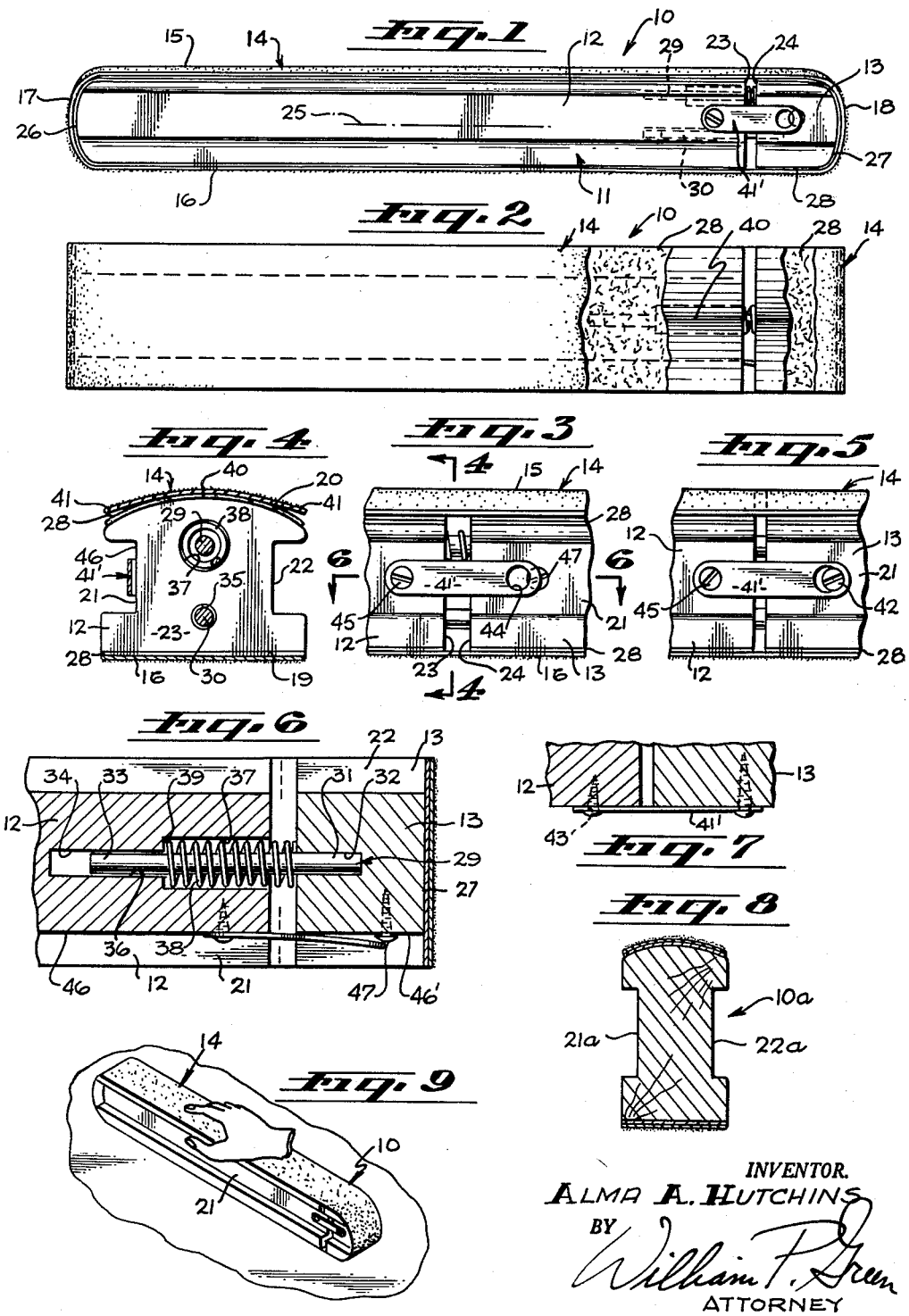
INVENTOR.
ALMA A. HUTCHINS
BY William P. Green
ATTORNEY

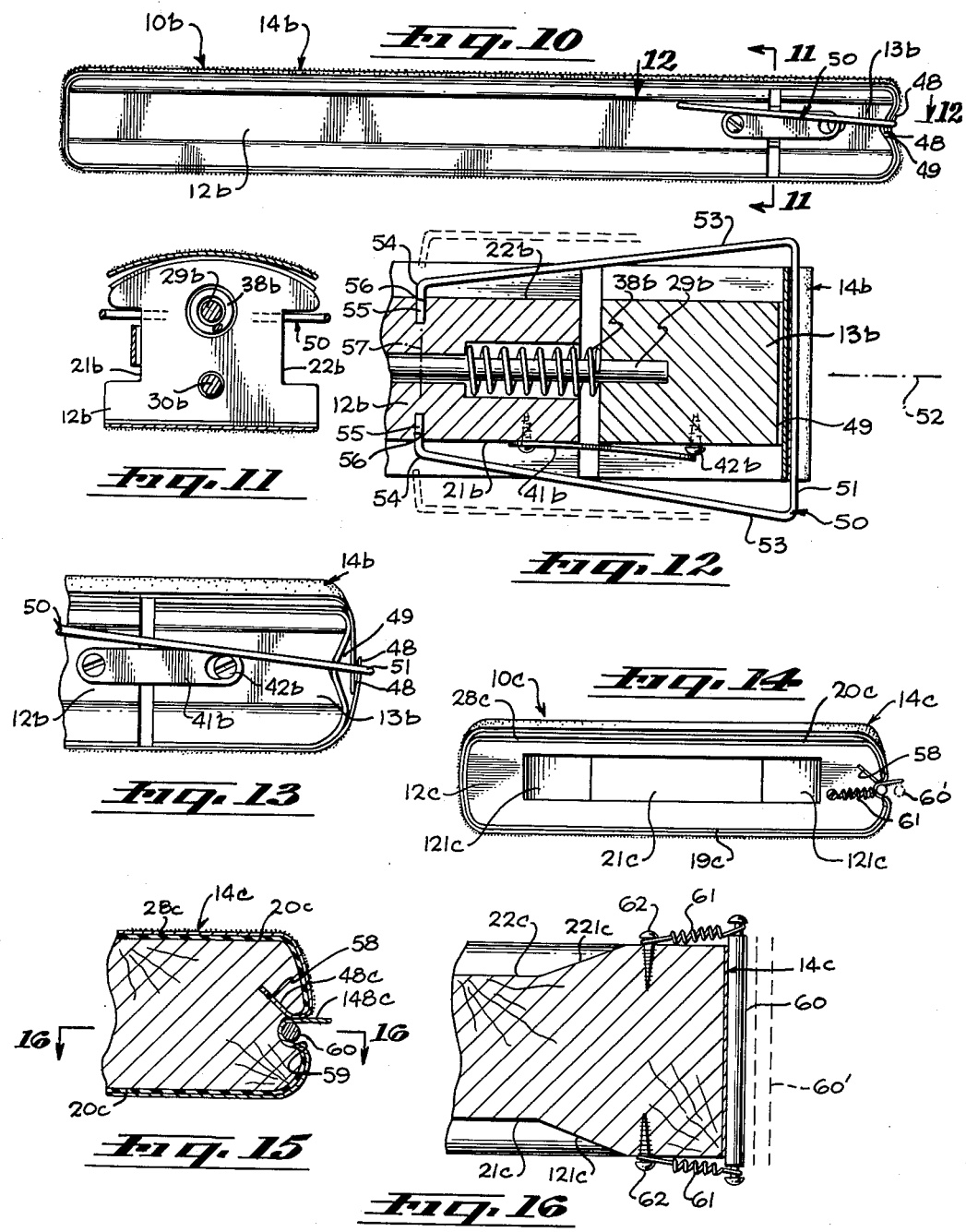

United States Patent Office 3,106,806
Patented Oct. 15, 1963

3,106,806
WORK SMOOTHING TOOL
Alma A. Hutchins, 3190 Primavera St., Pasadena 8, Calif.
Filed Apr. 2, 1962, Ser. No. 184,142
5 Claims. (Cl. 51—187)

This invention relates to improved hand tools for performing a sanding, buffing, or similar operation on a work piece.

Tools constructed in accordance with the invention are of a general type adapted to receive and carry a piece of sheet material, such as sandpaper or a buffing cloth, and to then be moved manually over a work surface in a manner causing the sandpaper or buffing cloth to perform a desired smoothing or other operation on that surface. A major object of the invention is to provide a tool of this type which is capable of performing a sanding or similar operation on work surfaces of virtually all of the various contours which may be encountered in most sanding operations, particularly in the sanding of automobile bodies, a use for which the present tool is in some respects especially designed. Certain additional features of the invention reside in the specific manner of construction of the various parts of the tool, in order to attain maximum facility of handling, ease of replacement of the sandpaper, and various other related advantages.

A particular object of one form of the invention is to provide a tool structure which is capable of making more efficient use of a certain quantity of sandpaper, or other work engaging material, than has been possible in conventional prior devices for the same purpose. As will appear, in this form of the invention, the tool is adapted to hold a piece of sandpaper or the like in a manner such that every portion of the paper may be brought directly against the work surface, and be utilized to the fullest extent, before it becomes necessary to discard the paper. Because of the manner of retention of the sandpaper or its equivalent on the tool, there is no necessity for any edge or end portions of the paper to be gripped by a retaining clamp and therefore be held in positions in which they are incapable of ever contacting and acting against a work surface.

Structurally, a tool embodying the invention consists of a body about which the sandpaper, buffing cloth or other work engaging material extends along an essentially endless path. Substantially the entire surface of this strip or belt may be exposed for direct contact with a work piece. Different portions of the body are given different contours for backing up the belt while it engages work surfaces of different shapes. Preferably, two opposite longitudinal sides of the body, which engage and back up two main longitudinal portions of the endless belt, are shaped differently, with one of these surfaces preferably being essentially flat, while the other surface is for best results of rounded cross-section, to engage curved work surfaces. Similarly, the opposite ends of the body may be rounded or curved.

The body may be formed of a plurality of body sections, including two such sections engaging the belt at its oposite ends respectively. These two sections may be relatively longitudinally movable to tighten the belt on the body, and to release the belt for removal when desired. The body sections may be yieldingly urged apart by a spring, which may be disposed about one of two guide pins acting to guide the sections for only longitudinal movement relative to one another. It is also found desirable that a latch structure be incorporated in the tool, serving to hold the two sections in their predetermined belt removal positions, with the latch structure desirably taking the form of a leaf-spring mounted to one of the sections, and typically engaging a screw in the other section to very simply latch the parts together. To avoid projection of the latch mechanism to an inconvenient position when the tool is in use, this mechanism may be mounted to the body sections within the previously mentioned grooves formed therein.

In one form of the invention, the belt is actually of endless construction, while in other forms the belt may extend along an essentially endless path but be cut at one point to have two separable ends. A retaining member of unique construction may then be provided for clamping one or both of the belt ends to the body.

The above and other features and objects of the present invention will be better understood from the following detailed descriptions of the typical embodiments illustrated in the accompanying drawings, in which:

FIG. 1 is a side view of a first form of sanding tool constructed in accordance with the invention;

FIG. 2 is a plan view, partially broken away, of the FIG. 1 tool;

FIG. 3 is a fragmentary side view of the tool;

FIG. 4 is a cross-section on line 4—4 of FIG. 3;

FIG. 5 is a view similar to FIG. 3, but showing the latch in its active position;

FIG. 6 is a section on line 6—6 of FIG. 3;

FIG. 7 is a section corresponding to a portion of FIG. 6, but showing the latch in its active position;

FIG. 8 is a cross-sectional view of a slightly different tool, the view being similar to FIG. 4, but taken at a different point along the length of the tool;

FIG. 9 is a perspective view illustrating the manner of use of either of the two previously shown tools;

FIG. 10 is a side view of another form of tool;

FIGS. 11 and 12 are enlarged sections taken on lines 11—11 and 12—12 respectively of FIG. 10;

FIG. 13 is a fragmentary enlarged side view illustrating the tool of FIG. 10 in condition for removal and replacement of the sanding belt;

FIG. 14 is a side view of a fourth form of tool;

FIG. 15 is an enlarged fragmentary section through an end portion of the device of FIG. 14; and FIG. 16 is a section taken on line 16—16 of FIG. 15.

Referring first to FIGS. 1 through 7, and especially to FIGS. 1 and 2, I have shown at 10 a hand carried type of sanding or buffing tool constructed in accordance with the invention. This tool includes an elongated body generally designated 11, consisting of a first relatively long main body section 12, and a shorter end body section 13. About these body sections, there is carried an endless belt 14, illustrated as a sanding belt though it is to be understood that this element may also be an endless belt of buffing cloth, or other desired work engaging material. Belt 14 has an upper portion 15 extending along the upper surface of body 11, a lower portion 16 extending along the underside of the body, and two end portions 17 and 18 curving about the opposite ends of the body. Thus, the belt forms a complete loop extending entirely about the body. It will of course be understood that the tool may be manipulated to any desired position relative to a work surface, and that any references in this specification or the appended claims to a top surface, bottom surface, upper surface, lower surface, or the like, are utilized merely for clarity of description in considering the tool as it appears in the drawing.

The two body parts 12 and 13 may both be formed of wood, and may be of identical cross-section along their entire axial extents, except as that cross-section may be altered slightly for reception of the various pins, spring, and latch elements to be discussed at a subsequent point in this description. More particularly, the cross-section of parts 12 and 13 is externally as illustrated in FIG. 4, to provide a planar flat surface 19 at the bottom of each of the parts 12 and 13, and an upwardly bulging or convex rounded top surface 20. This surface 20 may be of arcuate cross-section, as seen in FIG. 4. At the opposite sides of parts 12 and 13, there are provided in these parts oppositely facing grooves 21 and 22, of a size to receive the fingers and thumb of a user when the device is being employed for a sanding or buffing operation. The grooves 21 and 22 of part 13 are of course aligned axially with, and form in effect continuations of, the corresponding grooves of part 12. Similarly, the top and bottom surfaces 20 and 19 of part 13 form in effect continuations of the corresponding surfaces of part 12.

The adjacent surfaces 23 and 24 of parts 12 and 13 may be planar, and disposed directly transversely of the main longitudinal axis 25 of body 11 and its two parts 12 and 13. Planar surfaces 23 and 24 desirably extend entirely across both of the parts 12 and 13, being planar to all of the various edges or side surfaces 19, 20 etc. of the body parts. Parts 12 and 13 may in fact be formed of a single piece of wood, initially shaped to the cross-section illustrated in FIG. 4, and then cut transversely of the longitudinal axis of the part to divide the single piece of wood into two, with the cut occurring between and forming parallel transverse surfaces 23 and 24.

At the opposite ends of the body, the two parts 12 and 13 are rounded to form arcuately curved surfaces 26 and 27, which give to the end portions 17 and 18 of the sandpaper or buffing cloth a correspondingly curved or rounded configuration enabling them to fit work surfaces of curved contour.

For assuring effective frictional retention of belt 14 in the proper illustrated position relative to the sections 12 and 13, there is preferably provided along the outer belt engaging surfaces of each of the parts 12 and 13 a layer of high-friction material 28. In the case of part 12, for example, this layer of material 28 may begin at the upper edge of surface 23 (as viewed in FIG. 1), and continue from that location to the left along the entire upper surface 20 of part 12, and then curve downwardly about, and cover, end surface 26, finally continuing horizontally along the underside of bottom surface 19 to the bottom edge of transverse surface 23. In extending along this path, the material 28 may completely and continuously cover the entire upper surface 20, and surface 26, and bottom surface 19, across their entire longitudinal and transverse extents. In the same manner, the material 28 extends along the entire under surface 19, end surface 27, and upper surface 20 of the smaller end piece 13, to retain the belt in fixed position relative thereto.

Material 28 may be any suitable high-friction sheet material, preferably bonded continuously to the engaged surfaces of parts 12 and 13, as by a suitable cement. For best results, it is preferred that the material 28 be an irregularized high-friction elastomeric material, such as a suitable resinous plastic material, typically carried by a backing of sheet material by which it is bonded to the wood of parts 12 and 13. The most desirable friction material found to date for use as a layer 28 on the body parts is the resinous plastic material sold by Minnesota Mining and Manufacturing Corporation as "Scotch Tred."

Parts 12 and 13 are connected together for only longitudinal movement relative to one another (parallel to axis 25). To connect the parts for such relative movement I provide two parallel guide pins 29 and 30, which may be externally cylindrical, and extend parallel to longitudinal axis 25 of the tool. These pins may be identical with one another, having first ends 31 received and rigidly secured within recesses 32 formed in part 13, and having second ends 33 projecting into and slidably received and guided within longitudinal cylindrical recesses 34 and 35 formed in part 12. The recess 35 within which pin 30 is received, may be of uniform diameter along its entire extent, and of a size to closely receive and guide pin 30. The recess 34 within which the second pin 29 is received, on the other hand, may have a reduced diameter cylindrical portion 36 closely receiving and guiding the end of pin 29, and have an enlarged diameter cylindrical counterbore 37 adjacent surface 23. Within counterbore 37, there is positioned a coil spring 38, whose opposite ends engage a shoulder 39 formed in part 12 and the transverse surface 24 formed on part 13, with the spring 38 normally urging parts 12 and 13 relatively apart to and beyond the position of FIG. 1. Thus, spring 38 urges parts 12 and 13 with substantial force in opposite directions against the opposite end portions 17 and 18 of belt 14, to retain the belt in tight engagement with friction material 28. At the location of upper surface 20 of parts 12 and 13, the top run 15 of the belt may normally engage only the central portion of layer 28, at 40, but when the portions 41 of the work engaging sheet material are brought into engagement with a work piece, these portions 41 automatically are pressed against sheet material 28, to be backed up thereby and held in the desired curved or rounded condition during a sanding or other similar operation. When it is desired to remove belt 14, or substitute another belt, part 12 and 13 are pressed axially together, to the position illustrated in FIG. 5, and sufficiently to release the forces exerted on the end portions of the belt by parts 12 and 13, so that the belt may be slipped laterally off of the body. During removal or replacement of a belt, the parts 12 and 13 are retained in the FIG. 5 setting by a releasable latch structure, including a latch element 41' carried by part 12, and a keeper or second latch element 42. Part 41 may take the form simply of an essentially flat leaf-spring, having the configuration illustrated in FIGS. 3 and 5, and having a fairly small opening 43 (FIG. 7) near one of its ends, and a larger opening 44 at its other end. A screw 45 extends through opening 43, and is connected into part 12, to rigidly secure a first end of spring 41' to part 12. As seen in the figures, leaf-spring 41' is preferably received within side groove 21, essentially parallel to its inner wall 46, and projects longitudinally into the corresponding groove 21 of part 13. The free end of spring 41 normally returns to the position of FIG. 6, in which it is bowed slightly away from inner wall 46' of groove 21 in part 13.

The keeper element or second latch part 42 may take the form simply of a screw, having an enlarged head 47 which is almost but not quite as large as opening 44 in leaf-spring 41. Screw 42 is connected into surface 46' of part 13, with the head spaced from that surface a distance X (FIGS. 6 and 7) which is at least as great as the thickness of spring 41. Also, the screw 47 is so positioned that head 47 may be received within opening 44 when parts 12 and 13 are pressed longitudinally toward one another, and leaf-spring 41' may then be retained beneath head 47 to releasably lock the parts in the FIG. 5 belt removal relative positions.

To now describe the manner of use of the tool of FIGS. 1 through 8, assume first that a sanding or other belt 14 is already on the tool, in the condition of FIG. 1. The user may then merely place his hand on the upper surface of the tool (see FIG. 9) with his thumb and fingers received in the grooves 21 and 22 at the opposite sides of the tool to effectively grip and hold the tool. He then manipulates the tool as desired to sand or smooth a work surface. If the work surface is contoured, he may invert the tool so that the curved surface 20 and corresponding portion of the sandpaper engage and act on the work, or he may use the curved ends of the tool.

If one portion of the sandpaper becomes more worn than another portion, parts 12 and 13 may be pressed together slightly beyond the FIG. 5 position, spring 41 may be pressed inwardly against surface 46' (with head 47 received in opening 44), and parts 12 and 13 may then be separated slightly to the latched position of FIG. 5. In this condition, the belt is free enough to be advanced about the body, to shift an unworn portion of the belt to a desired location, or the belt may be completely replaced if necessary.

FIG. 8 illustrates the cross-section of a second form of tool 10a embodying the invention, which may be identical with the first form 10 except that the FIG. 8 form is narrower between its opposite grooved sides 21a and 22a, and the belt and other parts are correspondingly narrower.

FIGS. 10 and 13 represent another form of sanding tool 10b which is the same as that of FIGS. 1 through 7 except that the FIGS. 10 through 13 device has been adapted to carry and hold a discontinuous non-endless strip or belt 14b of sandpaper, instead of the endless belt 14 of FIG. 1. That is, the belt 14b of FIGS. 10 through 13 terminates at two slightly overlapping ends 48, at the right end of the device, which are received within a transverse groove or recess 49 formed in the right end of body section 13b. This recess or groove 49 may be of uniform cross-section across the entire body section 13b. The overlapping ends of belt 14b are tightly clamped within groove 49 to secure the belt on the two sectioned body, by means of a retaining member 50.

The two body sections 12b and 13b may be substantially identical with the corresponding sections 12 and 13 of the FIG. 1 device. Section 13b carries two guide pins 29b and 30b, slidably received within bores in part 12b to guide section 13b for movement longitudinally of section 12b. A spring 38b yieldingly urge parts 12b and 13b relatively apart, while latch part 41b is engageable with screw 42b to retain parts 12b and 13b in the FIG. 13 position, for removal and replacement of the sanding belt.

The retaining member 50 is formed of a relatively strong wire or rod bent to the generally U-shaped configuration illustrated in FIG. 10. More particularly, this member 50 has a cross-piece portion 51 disposed transversely of the axis 52 of sliding movement of body section 13b relative to body section 12b (as determined by the axes of guide pins 29b and 30b). Cross-piece 51 is receivable within recess 49 in part 13b, and adapted to tightly clamp ends 48 of the belt 14b against the recessed portion of part 13b. From opposite ends of cross-piece 51, the two arms 53 of member 50 extend along the opposite sides of body sections 13b and 12b, progressively converging toward the ends 54 of the arms. At these ends, the two arms have portions 55 which are turned directly toward one another, in alignment with one another, and are receivable within mating small diameter bores or openings 56 in the opposite sides of body part 12b. The axis 57 of portions 55 of element 50 may be disposed directly transversely of axis 52 of pin 29b, so that member 50 may if desired be pivoted about axis 57 relative to the body sections. It is also noted that the ends 54 of member 50 extend into the two opposite side grooves or recesses 21b and 22b of the body, and preferably to a point beyond the location of latch element 41b. The arms 53 of member 50 may be adapted to be expanded outwardly, away from one another, as to the broken line positions of FIG. 12, to permit removal of member 50 if desired in order to allow the FIGS. 10 to 13 device to be utilized with a completely endless belt, in the manner discussed in connection with FIGS. 1 through 7. Also, arms 53 may be resilient, to normally return to the full line position of FIG. 12, by virtue of their own resilience, for retaining member 50 in its FIG. 12 position of connection to the body.

In using the FIGS. 10 through 13 device with a discontinuous non-endless belt of the type shown at 14b in FIG. 10, the belt may be applied by first moving section 13b toward section 12b to the FIG. 13 setting, and then retaining the body sections 12b and 13b in these proximate positions by setting latch element 41b. Next, the belt 14b is mounted about body sections 12b and 13b, in a position of extension along an essentially endless path thereabout, and with the free ends 48 of the belt received between cross-piece 51 of member 50 and the wall of groove 49. As will be apparent, in the FIG. 13 setting, cross-piece 51 is spaced sufficiently from the wall of groove or recess 49 to allow easy insertion of the two ends 48 of the belt between cross-piece 51 and the grooved wall. After the belt has been installed to the FIG. 13 condition, parts 12b and 13b are pressed toward one another until latch element 41b snaps out of engagement with keeper 42b, following which the body sections 12b and 13b are allowed to move relatively apart, under the influence of spring 38b, so that the belt ends 48 are clamped tightly between cross-piece 51 of the retaining member and body section 13b (FIG. 10). Thus, the belt is securely retained on the body, and is held in tight condition thereon by the action of spring 38b.

FIGS. 14 to 16 illustrate another form of sanding tool 10c formed in accordance with the invention, and in which the preferably wooden body 12c is formed of a single section rather than two sections. This piece of wood 12c may have an upper transversely curved surface 20c corresponding to surface 20 of FIG. 4, and may have a lower planar surface 19c corresponding to surface 19 of FIG. 4. Also, a strip of high friction material 28c may extend substantially entirely about the body 12c, to serve the purpose of material 28 of the first form of the invention. At opposite sides of the body 12c, this part may contain two parallel oppositely facing grooves 21c and 22c for receiving a person's fingers when using the tool. These grooves 21c and 22c may terminate short of the opposite ends of body 12c, as represented at 121c and 221c.

The sanding belt 14c of FIGS. 14 through 16 is represented as a non-continuous belt, having two ends 48c and 148c meeting at the right end of the device. For receiving end 48c of the belt, the body part 12c contains a transverse slit 58 extending across the entire width of the body, and having the cross-section illustrated in FIGS. 14 and 15 across that entire width. This slit is of a size to receive edge 48c in a relatively close fit, with the edge 48c being doubled back to extend upwardly as represented in FIGS. 14 and 15 when received within the slit. Just beneath the location of slit 58, body 12c contains a transverse groove 59, within which there is receivable a typically externally cylindrical retaining member or pin 60. The opposite ends of pin 60 are connected to a pair of springs 61, which are maintained under tension at all times, and whose second ends are secured by screws 62 to the opposite sides of body part 12c, at a location beyond one of the ends of grooves 21c and 22c.

To install belt 14c on the device of FIGS. 14 through 16, the first step may be to insert end 48c of the belt within slit 58, following which the belt is wrapped entirely around body 12c along an essentially endless path, so that the second end 148c of the belt may be inserted into groove or recess 59 of the body. To insert this second end into groove 59, the user may pull retaining element 60 outwardly away from body part 21c, as to the broken line position represented at 60' in FIG. 16. After the end 148c of the belt has been inserted between part 60 and the wall of groove 59, the element 60 is released to be pulled by springs 61 into the groove 59, and thereby to tightly clamp end 148c of the belt in the groove and against the adjacent portion of end 48c of the belt, to thereby effectively secure the belt on the body. The device may then be used in much the same manner as has been discussed with the other forms of the invention.

I claim:

1. A hand tool comprising a body constructed to carry a belt for engaging a work piece with the belt extending along an essentially endless path about the body, said body including two sections free for relative movement toward and away from one another to tighten the belt on the body and release it for removal, means movably connecting said sections together for said relative movement, a first spring yieldingly urging said sections relatively apart, and a spring latch for securing said sections against relative separating movement from a predetermined belt removal position, said latch including a leaf spring secured to a side of one of said sections, and a keeper element carried by the other section and releasably engageable by said leaf spring to latch the sections against said relative separating movement.

2. A hand tool comprising a body constructed to carry a belt for engaging a work piece with the belt extending along an essentially endless path about the body, said body including two sections free for relative movement toward and away from one another to tighten the belt on the body and release it for removal, means movably connecting said sections together for said relative movement, a first spring yieldingly urging said sections relatively apart, and a spring latch for securing said sections against relative separating movement from a predetermined belt removal position, said latch including a leaf spring secured to a side of one of said sections and containing an opening, and a screw secured to the other section and having a head receivable in latching relation within said opening in the leaf spring.

3. A hand tool comprising a body constructed to carry a belt for engaging a work piece with the belt extending along an essentially endless path about the body, said body including two sections free for relative movement toward and away from one another to tighten the belt on the body and release it for removal, means movably connecting said sections together for said relative movement, a first spring yieldingly urging said sections relatively apart, and a spring latch for securing said sections against relative separating movement from a predetermined belt removal position, said latch including a leaf spring secured to a side of one of said sections and containing an opening, and a screw secured to the other section and having a head receivable in latching relation within said opening in the leaf spring, said spring being urged by its own resilience in a direction to detach it from said screw.

4. A hand tool comprising a body constructed to carry a belt for engaging a work piece with the belt extending along an essentially endless path about the body, said body including two sections free for relative movement toward and away from one another to tighten the belt on the body and release it for removal, said two body sections having grooves substantially aligned with one another extending along at least one side of said sections and accessible for receiving the fingers of a person when holding the tool in use, and a latch structure carried at one side of the body for retaining said sections against relative separating movement, said latch structure including a first latch part carried by one of said sections within said groove therein, and a second latch part carried by the other section in said groove therein and engageable in latching relation with said first latch part.

5. A hand tool comprising an elongated body constructed to carry thereabout an endless belt for engaging a work piece, said body including two sections for engaging the inner sides of opposite ends respectively of the belt and connected together for relative movement longitudinally of the body to tighten the belt on the body and release it for removal, said two body sections being formed primarily of wood and both being cut to substantially the same cross-section with longitudinally aligned grooves at their opposite sides for receiving the fingers of a person when holding the tool in use, each of said body sections including a main part having a layer of high friction material secured thereto at a location to engage said belt and frictionally retain it on the body, and a latch structure carried at one side of the body for retaining said sections against relative separating movement, said latch structure including a first latch part carried by one of said sections within one of said grooves therein, and a second latch part carried by the other section within one of said grooves therein and engageable in latching relation with said first latch part.

References Cited in the file of this patent

UNITED STATES PATENTS

| 1,724,661 | Johnson | Aug. 13, 1929 |
| 1,844,996 | Walker | Feb. 16, 1932 |
| 1,927,574 | Parks | Sept. 19, 1933 |
| 2,270,835 | Hibert | Jan. 20, 1942 |
| 2,411,615 | Dodelin | Nov. 26, 1946 |
| 2,457,466 | Hanna | Dec. 28, 1948 |
| 2,493,852 | Bonkowski | Jan. 10, 1950 |
| 2,531,588 | Stucker | Nov. 28, 1950 |
| 2,553,254 | Hays | May 15, 1951 |
| 2,655,772 | Lewis | Oct. 20, 1953 |
| 2,761,257 | Mendelsohn | Sept. 4, 1956 |
| 2,848,850 | Metoff | Aug. 26, 1958 |
| 2,982,059 | Trussell | May 2, 1961 |
| 3,014,316 | Barnhart | Dec. 26, 1961 |
| 3,063,208 | Bell et al. | Nov. 13, 1962 |

FOREIGN PATENTS

| 21,740 | Finland | May 27, 1947 |
| 403,801 | Italy | Mar. 8, 1943 |